United States Patent [19]
Ely

[11] 3,872,059
[45] Mar. 18, 1975

[54] POLYMERIC SEALANTS

[75] Inventor: Christopher Scott Ely, Birmingham, England

[73] Assignee: Albright & Wilson Limited, Oldbury, Warley, West Midlands, England

[22] Filed: Oct. 29, 1973

[21] Appl. No.: 410,700

Related U.S. Application Data

[63] Continuation of Ser. No. 259,935, June 5, 1971, abandoned.

[30] Foreign Application Priority Data

June 3, 1971 United Kingdom ............ 18790/71

[52] U.S. Cl. ...... 260/79.1, 260/46.5 G, 260/46.5 E, 260/79, 260/824 R
[51] Int. Cl. .......................................... C08g 23/00
[58] Field of Search... 260/79, 79.1, 46.5 G, 46.5 E, 260/824 R

[56] References Cited
UNITED STATES PATENTS

| | | | |
|---|---|---|---|
| 3,123,495 | 3/1964 | Carpenter et al. | 260/79 |
| 3,317,461 | 5/1967 | Plueddemann | 260/79 |
| 3,476,826 | 11/1969 | Millen | 260/79.1 |
| 3,714,132 | 1/1973 | Nakanishi | 260/79 |
| 3,717,617 | 2/1973 | Marrs et al. | 260/79 |

*Primary Examiner*—Melvyn I. Marquis
*Attorney, Agent, or Firm*—Flynn & Frishauf

[57] ABSTRACT

A moisture curable sealant containing unreacted SH groups comprises the product of reacting under anhydrous conditions (1) a polysulphide of the statistical formula $$HS(CH_2(R')_bCH_2S_a)_c(CH_2(R'')_{b'}CH_2S_a)_d(CH_2(R')_bCH_2)SH$$

wherein $a$ is 2, 3 or 4; $b$ and $b'$ are 0 or 1; $c$ is 20 – 50; $d$ is less than $0.05c$; $R'$ is a divalent radical free from aliphatic unsaturation consisting of radicals containing C, H and at least one atom selected from the group consisting of O and S in the form of $-C-O-C$, $-OH$, or $-CSC-$ groups; $R''$ is a tri- or polyvalent radical containing C, H and at least one atom selected from the group consisting of O and S in the form of $C-O-C$, $-OH$, $-SH$ or $-CSC-$ groups; with an amount of (2) a compound of the formal $QSiX_3$ wherein Q is a group selected from a group having a terminal epoxide group, 3-(methacryloxy)-propyl group, and a $CH_2=CH(C_mH_{2m})$ group wherein $m$ is 0, 1, 2 or 3, at least two of X are hydrolisable groups and the remainder, if any, is selected from the group consisting of monovalent hydrocarbon and chlorohydrocarbon radicals, sufficient to react with 3 – 30 percent of the SH groups of said polysulphide.

20 Claims, No Drawings

POLYMERIC SEALANTS

This application is a continuation application of application Ser. No. 259,935 filed June 5, 1972 and now abandoned.

The present invention relates to polysulphide sealing compositions. In particular it relates to compositions which can be employed as one pack sealants.

Hitherto although one pack sealants are available they are very slow to cure and it has been normal in the construction and other industries where sealant compositions are employed to use two pack sealants, that is to say the actual composition employed is obtained by mixing two ingredients (which may themselves be mixtures) on site immediately prior to use. For example polysulphides can be mixed with a curing or crosslinking agent. Satisfactory sealing is then obtained by reaction between these ingredients. This may present problems in operation, if only because of the difficulty of ensuring that the ingredients are mixed in the correct proportions and sufficiently thoroughly by unskilled or semi-skilled construction workers.

It would therefore obviously be desirable to produce a sealant which does not require on-site mixing but which can be employed directly as it comes out of its packaging and will cure automatically and rapidly under atmospheric conditions. There has not hitherto been produced such a composition which will exhibit sufficient good extension and recovery in the seal after 7 days exposure to air at room temperature and 50 percent relative humidity to comply with the demands of various construction industry test specifications. In U.S. Pat. No. 1,031,914 there is described a polysulphide composition which, it is stated may be employed as a sealant or as a rubber. It is stated that in order to obtain satisfactory results, it is necessary to incorporate into each polysulphide chain two silicon atoms which have an average of at least 1.5 hydrolysable groups attached to them. Such compounds are obtained by the reaction of polysulphide chains with substantial excesses (about 4 moles of silicon compound per mole of polymer,) of di- or tri-alkoxysilanes, such silanes containing an unsaturated carbon - carbon bond, or other group capable of reacting with polysulphide polymer such as an epoxy group. These compounds are stated to be curable when exposed to moisture although for many of them a curing catalyst, such as a tin salt or a titanium compound, may be required. Such formulations have not, however, found use as sealants possibly as a result of the high cost of silicon compounds.

We have now found that it is possible to obtain satisfactory sealant compositions, which comprise polysulphide reacted with substantially fewer silicon atoms than the number required to provide two for every polysulphide molecule, providing that particular precautions are taken. Firstly we have found that it is necessary to exclude all but a very small amount of tin compounds from the compositions. This is because if less than 2 silicon atoms are employed per polysulphide molecule there is inevitably left a number of free —SH groups on the molecule. These tend to react with the tin compounds to cause curing in the packaging and resulting in the composition being unsuitable for use. We have also found that in order to maintain a good shelf life for the polysulphide sealant before use it is desirable to incorporate small amounts of inhibitors into the compositions such as compounds of the formula

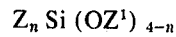

where Z is alkyl, or aryl, $Z^1$ is methyl, acetyl or acyl, and $n$ is 0,1 or 2.

Accordingly the present invention provides a sealant composition, which contains substantially no tin compounds or other compounds which react at room temperature under anhydrous conditions with —SH bonds, and comprises a polysulphide of the statistical formula

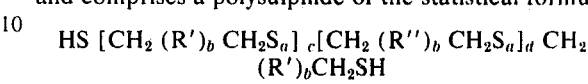

where $a$ is 2,3 or 4, $b$ is 0 or 1, $c$ is at least 1, $d$ is less than 0.05c, R' is a divalent radical free from aliphatic unsaturation, consisting of hydrocarbon radicals containing C, H and O and/or S in the form of — C — O — C, OH, SH, or — C — S — C — linkages R'' is a tri or polyvalent radical containing CH and O and/or S in the form of —C — O—C OH, SH or C — S — C linkages which has previously been reacted with sufficient of a compound of the formula

where Q is a group having a terminal epoxide group, a

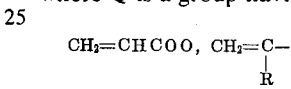

where $m$ is 1,2 or 3, R is alkyl- or aryl-, at least two X's are hydrolisable groups and the remainder are monovalent hydrocarbon or chlorohydrocarbon radicals, to react with from 3 to 30 percent of the SH linkages of the polysulphide.

Typically polysulphides for use in sealant compositions according to the invention will contain

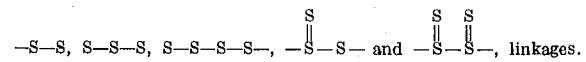

Compounds which are particularly of use are those having —S—S— or both S—S and —S— linkages, in particular those containing a multiplicity of ($CH_2$ $CH_2$ O $CH_2$ O $CH_2$ $CH_2$ $S_2$ ) groups. Compounds for use in the compositions of the present invention frequently contain from 20 to 50 such groupings however, other compounds may be employed if desired. It is possible that a small number of the polysulphide molecules employed are branched.

Silicon compounds are reacted with such polysulphides in amounts so as to react with up to 30 percent of the —SH groups present in the polymer. The amount of silicon compound which it will be necessary to employ to produce reactions to this extent will depend upon the reactivity of the silicon compound employed. For example employing a reactive compound such as 3-glycidoxy — (trimethoxy silyl— ) propane it may be possible to employ amounts of no more than 0.3 mole of silicon compound per equivalent of SH group, whereas for less reactive compounds such as vinyl triethoxy silane amounts up to 1.5 moles of silicon compound equivalent per SH group may be required.

It should be understood that in the method hereinafter described in many cases only a small proportion of the silicon compound employed actually reacts with the SH groups available. We have, however, found that there is a certain critical minimum amount of silicon compound which must have reacted with the polymer in order to obtain a composition which will cure satisfactorily and that if the silicon compounds are simply mixed with a curing catalyst and the polysulphide polymer no cure of the polysulphide will occur at room temperature. The amount of silicon which has in fact reacted with the polysulphide polymer may be determined by the method described by B Saville in Analyst 86 page 29 (1961) modified to keep the polymer in dispersion.

Preferably from 5 to 20 percent of SH groups are reacted with the silicon compound.

The preferred silicon compounds for use in the production of the sealant compositions are vinyltriethoxy- and trimethoxysilanes, vinyl methyl diethoxy- and vinyl methyl dimethoxy-silane. Other compounds which may be employed, however, include compounds such as vinylhexyldiethoxysilane, 3-glycidoxy-(1-trimethoxy silyl-) propane and 3-(propyltriethoxysilyl) methacrylate. In particular a variety of hydrolisable groups may be present in the silicon compound including the alkoxy groups mentioned above and acyloxy and hydrocarbyl substituted isocyanoxy groups. If desired a mixture of silicon — containing compounds may be employed. Such silicon — containing compounds can be caused to react with the polysulphides by reacting the polysulphide in a suitable solvent or alone with the silicon-containing compound under substantially anhydrous conditions. The temperature and time required for satisfactory addition will of course depend upon the reactivity of the silicon compound. If desired, a catalyst may be employed to assist in this reaction, for example, peroxide or other catalysts may be employed. We have found, however, that we can normally obtain a satisfactory incorporation of silicon moieties with the polysulphide without it being necessary to employ such catalysts.

Compounds produced by the above process can undergo crosslinking when exposed to moisture. It may also be desirable to incorporate with them catalysts, which while they do not react with the hydrolisable groups under anhydrous conditions promote the cross-linking action in the presence of moisture. We have found that titanate esters, in particular isopropyl-, butyl-, and other alkyl titanates, or chelated alkyl titanates are particularly suitable for this purpose.

Accordingly, from a second aspect, the present invention provides a water impermeable pack, containing an anhydrous composition comprising the reaction product of a polysulphide, as hereinbefore defined, with sufficient of a silicon compound, as hereinbefore defined, to react with up to 30 percent of the SH groups of the polysulphide, and preferably contains a catalyst which, whilst unreactive with the polymer under anhydrous conditions, promotes its cross linking in the presence of moisture.

We have also found, as mentioned previously, that for some of the sealants it may be desirable to incorporate in the mixture an inhibitor to assist in improving the shelf life of the composition. Such inhibitors may be present in amounts of up to 10 percent by weight and preferably 0.5 - 3 percent. Such compounds may typically be silicon compounds, unreactive with the polysulphide, but able to react preferentially with small quantities of water. Typicallly they are of the formula $$Z_n — Si\ OZ^1{}_{4-n}$$

where n is 0, 1 or 2 where Z is alkyl or aryl and $Z^1$ is a methyl-, ethyl-, acetyl-, or other acyl group.

There may also be incorporated into the sealant compositions other materials conventionally used in such compositions as plasticisers fillers and pigments and thixotroping agents.

It is essential that the sealant material be substantially anhydrous before being packed in a water impervious pack. This can be achieved by azeotroping the composition with a suitable solvent, e.g., toluene. The azeotroping and reaction of the silicon compound with the polysulphide may be carried out as one operation if a suitable solvent for the reaction is employed, for example using toluene. If this is done then the reaction mixture simply heated to the azeotropic distillation temperature during completion of the reaction.

Alternatively the silicon compound can be first reacted with the polysulphide and the remaining ingredients excepting the crosslinking promotor admixed with it prior to azeotroping.

Compositions according to the invention and the methods of production are illustrated by the following Examples.

EXAMPLE 1

A mixture of 100g of an anhydrous polysulphide polymer with an —SH equivalent of 2,780 being essentially of the statistical composition $$HS(CH_2CH_2OCH_2OCH_2CH_2SS)_{28}(CH_2CHSHCH_2SS)_{0.008}(CH_2CH_2OCH_2OCH_2CH_2)SH$$

was reacted with 3g of vinyl methyl dimethoxy silane at 100°C for 24 hrs. At this stage analysis showed that 83.5 percent of the SH groups remained unreacted.

This product was compounded with fillers and plasticizers to yield a sealant which when tested according to the procedure laid down in the specification SMC-5 after only 7 days cure at 50 percent RH and 20°C rather than 28 days at 100 percent RH and 25°C passed the cure test as laid down in Appendix B.

EXAMPLE 2

A mixture of 100g of an anhydrous polymers with an —SH equivalent 2190 of the statistical composition $$HS(CH_2CH_2OCH_2OCH_2CH_2SS)_{23}(CH_2CHSHCH_2SS)_{0.0025}(CH_2CH_2OCH_2OCH_2CH_2SH$$

and 5g of vinyltriethoxysilane was heated at 120°C for 24 hrs. Analysis of this product shows that 89.2 percent of the —SH groups remained unreacted.

This material when formulated and tested as in Example 1 gave a rubbery material which extended by 50 percent at a force of 12 lbs per square inch.

EXAMPLE 3

A mixture of an anhydrous polymer with an —SH equivalent of 2735 of the statistical composition

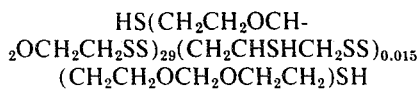

and 5 gms vinyl tri-ethoxy silane was heated at 120°C for 24 hrs. Analysis of this product showed that 94.6 percent of the —SH groups remained unreacted.

This material when formulated and tested as in Example 1 gave a rubbery material which extended by 50 percent at a force of 15 lbs per square inch.

I claim:

1. A moisture curable sealant maintained under anhydrous conditions containing unreacted SH groups which comprises the addition product of reacting under anhydrous conditions (1) a polysulphide of the statistical formula

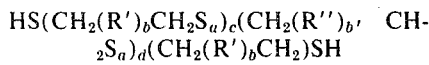

wherein $a$ is 2, 3 or 4; $b$ and $b'$ are 0 or 1; $c$ is 20 – 50; $d$ is less than $0.05c$; $R'$ is a divalent radical free from aliphatic unsaturation consisting of radicals containing C, H and at least one atom selected from the group consisting of O and S in the form of —C—O—C, —OH, or —CSC— groups;

$R''$ is a tri- or polyvalent radical containing C, H and at least one atom selected from the group consisting of O and S in the form of C—O—C, —OH, —SH or —CSC— groups;

with an amount of (2) a compound of the formula $QSiX_3$ wherein Q is a group selected from a group having a terminal epoxide group, 3-(methacryloxy)-propyl group, and a $CH_2=CH(C_mH_{2m})$ group, wherein $m$ is 0, 1, 2 or 3, at least two of X are hydrolisable groups and the remainder, if any, is selected from the group consisting of monovalent hydrocarbon and chlorohydrocarbon radicals, sufficient to react with 3–30 percent of the SH groups of said polysulphide.

2. A sealant according to claim 1 wherein $R''$ is a tri- or polyvalent radical containing C, H and S in the form of SH and $b'$ is 1.

3. A sealant according to claim 2 wherein $R''$ is a

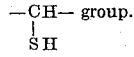 group.

4. A sealant according to claim 1 wherein $R'$ is a divalent radical free from aliphatic unsaturation consisting of radicals containing C, H and at least one atom selected from the group consisting of O and S in the form of C—O—C or C—S—C groups.

5. A sealant according to claim 4 wherein $R'$ is a $CH_2$ O $CH_2$ O $CH_2$ radical.

6. A sealant according to claim 1 wherein the polysulphide has been reacted with an amount of the compound of formula $QSiX_3$ sufficient to react with 5 – 20 percent of the SH groups of the polysulphide.

7. A sealant according to claim 1 wherein Q is a group selected from 3-glycidoxypropyl, 3-methacryloxypropyl and vinyl groups.

8. A sealant according to claim 7 wherein in the compound of formula $QSiX_3$, two of the X groups represents methoxy or ethoxy groups and the third represents a methoxy, ethoxy or methyl group.

9. A sealant according to claim 7 wherein the compound of formula $QSiX_3$ is selected from the group consisting of vinyl trimethoxy silane, vinyl triethoxy silane, vinyl methyl dimethoxy silane and vinyl methyl diethoxy silane.

10. A sealant according to claim 1 which also contains from 0.5 – 10 percent by weight of a silane inhibitor of the formula $Z_{n'}$ $Si(OZ')_{4-n'}$, wherein $n'$ is 0, 1 or 2, Z is alkyl or aryl and Z' is a methyl, ethyl or acyl group.

11. A sealant according to claim 1 which also contains as a moisture curing catalyst a titanate ester.

12. A sealant according to claim 11 wherein the titanate ester is tetraisopropyl titanate.

13. A sealant according to claim 3 which comprises the product of reacting a polysulphide of the statistical formula

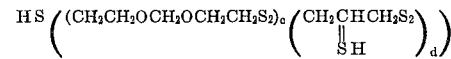

wherein $c$ is 20 – 50 and $d$ is less than $0.05c$ with a compound of formula $QSiX_3$ selected from the group consisting of vinyl trimethoxy silane, vinyl triethoxy silane, vinyl methyldimethoxy silane, vinyl methyldimethoxy silane, 3-trimethoxysilylpropyl methacrylate and 3-glycidoxypropyl - 1 - trimethoxy silane, sufficient to react with 3 – 30 percent of the SH groups of said polysulphide.

14. A process for the preparation of a moisture curable sealant maintained under anhydrous conditions containing unreacted SH groups, which process comprises reacting under anhydrous conditions a polysulphide as defined in claim 1 with an amount of a compound of formula $QSiX_3$, wherein Q and X are as defined in claim 1, sufficient to react with 3 – 30 percent of the SH groups in the polysulphide.

15. A process according to claim 14 wherein the polysulphide is reacted with an amount of the compound of the formula $QSiX_3$ sufficient to react with 5 – 20 percent of SH groups in the polysulphide.

16. A process according to claim 14 carried out in the absence of a solvent.

17. A process according to claim 14 wherein $R''$ in the polysulphide is

18. A process according to claim 17 wherein $R'$ is $CH_2O$ $CH_2O$ $CH_2$.

19. A process according to claim 17 wherein in the compound of formula $QSiX_3$, two of the X groups represent methoxy or ethoxy groups and the third represents a methoxy, ethoxy or methyl group.

20. A process according to claim 18 which comprises reacting a polysulphide of the statistical formula

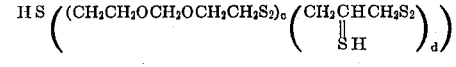

wherein $c$ is 20 – 50 and $d$ is less than $0.05c$ with a compound of formula $QSiX_3$ selected from the group consisting of vinyl trimethoxy silane, vinyl triethoxy silane, vinyl methyldimethoxy silane, vinyl methylsimethoxy silane, 3-trimethoxysilylpropyl methacrylate and 3-glycidoxypropyl — 1 — trimethoxy silane, sufficient to react with 3 – 30 percent of the SH groups of said polysulphide.

* * * * *

UNITED STATES PATENT OFFICE
CERTIFICATE OF CORRECTION

Patent No. 3,872,059        Dated March 18, 1975

Inventor(s)     CHRISTOPHER SCOTT ELY

It is certified that error appears in the above-identified patent and that said Letters Patent are hereby corrected as shown below:

Title page:

left column:

the line starting with "[63]", should read
    --Continuation of Ser. No. 259,935, June 5, 1972,--;

the line below line "[30]" should read
    --June 3, 1971    United Kingdom    18910/71--.

right column:

In the ABSTRACT, ninth line from the end, the word
    "formal" should read --formula--

Column 1:

Line 32, "U. S." should read --Brit.--.

Column 4:

Line 56, the formula should read
    $--H_2OCH_2OCH_2CH_2)SH--$.

Column 6:

Lines 18-19 and lines 56-57, the vertical double bond which appears in the formula in both of these locations should be a vertical single bond.

Signed and Sealed this

Seventh Day of September 1976

[SEAL]

Attest:

RUTH C. MASON  
*Attesting Officer*

C. MARSHALL DANN  
*Commissioner of Patents and Trademarks*